United States Patent [19]
Houston et al.

[11] 3,976,430
[45] Aug. 24, 1976

[54] FORCED CIRCULATION COOLING CRYSTALLIZER

[75] Inventors: James E. Houston, Grand Island, N.Y.; Reynard W. Gingrich, Fort Erie, Canada; Earl A. Schilt, Kenmore, N.Y.

[73] Assignee: Hooker Chemicals & Plastics Corporation, Niagara Falls, N.Y.

[22] Filed: Aug. 5, 1974

[21] Appl. No.: 494,933

[52] U.S. Cl. .......................... 23/273 R; 23/295 R; 165/107; 165/108; 165/109; 159/1 C; 159/28 B; 122/406 R
[51] Int. Cl.² .......................................... B01D 9/02
[58] Field of Search .......... 23/273 H, 273 R, 271 R, 23/295; 165/108, 109, 107; 159/1 C, 27 B, 28 A, 31; 122/406

[56] References Cited
UNITED STATES PATENTS

| | | | |
|---|---|---|---|
| 1,525,094 | 2/1925 | Jones | 165/109 |
| 1,646,454 | 10/1927 | Isaachsen | 23/273 |
| 1,765,916 | 6/1930 | Haber | 165/108 |
| 2,323,474 | 7/1943 | Kraft | 165/108 |
| 2,577,856 | 12/1951 | Nelson | 165/108 |
| 2,663,162 | 12/1953 | Trepoud | 165/108 |
| 2,764,233 | 9/1956 | Skinner | 159/27 B |
| 2,878,108 | 3/1959 | Chandler | 165/108 |
| 2,979,308 | 4/1961 | Putney | 165/188 |
| 3,349,755 | 10/1967 | Miller | 165/108 |

FOREIGN PATENTS OR APPLICATIONS

| | | | |
|---|---|---|---|
| 52,192 | 9/1936 | Denmark | 23/273 R |
| 806,389 | 9/1936 | France | 165/109 |
| 14,317 | 1962 | Japan | 159/27 B |
| 148,015 | 1/1961 | U.S.S.R. | 23/273 R |

*Primary Examiner*—Stephen J. Emery
*Attorney, Agent, or Firm*—Peter F. Casella

[57] ABSTRACT

A continuous integral forced circulation cooling crystallizer for the processing of fluids which comprises, in vertical disposition:

A. an upper fluid holding chamber having an inlet and outlet for the fluid to be processed and having a partition means vertically disposed therein to provide an inlet section and an outlet section, the partition means being positioned so as to permit fluid flow between the sections at the lower region;

B. a heat exchange chamber comprising a multiplicity of separate vertically disposed tubular elements a fluid inlet and outlet to permit the flow of a heat exchange fluid through the extra-tubular portion of the chamber, and a multiplicity of horizontally disposed baffles adapted to direct the flowof the heat exchange fluid through the extra-tubular portion of the heat exchange chamber; and flow of C. a lower pump chamber, vertically partitioned to provide an intake section and a discharge section and having a pump means disposed therein to provide forced circulation 36 section of the fluid to be processed between the intake section and the discharge section.

A first portion of the tubular elements provides direct fluid communication between the inlet section of the holding chamber and the intake section of the pump chamber; and a second portion of the tubular elements provides direct fluid communication between the discharge section of the pump chamber and the outlet section of the holding chamber.

In response to the pump means, a fluid to be processed circulates, in sequence, from the inlet section of the holding chamber, downward through the first portion of the tubular elements, through the intake and discharge sections of the pump chamber, then upward through the second portion of the tubular elements, to the outlet section of the holding chamber.

4 Claims, 3 Drawing Figures

FORCED CIRCULATION COOLING CRYSTALLIZER

BACKGROUND OF THE INVENTION

Crystallization is commonly employed in the chemical process industries either as means of removing dissolved impurities from a solution or as a means of recovering a desired product from solution. The removal or recovery of dissolved materials from solution generally involves either an evaporation or a cooling process. In the process of crystallization by means of cooling, the solution is cooled to lower the solubility of the dissolved material and cause it to precipitate or crystallize from the solution. Suitable crystallization apparatus commonly includes a heat exchange unit. Typically, such a unit comprises a tank, holding the solution to be cooled, and a means, such as a tube or a series of tubes, for example in the form of a helical coil, through which is circulated a liquid cooling medium. As the temperature of solution is lowered, solubility of the dissolved materials is decreased and precipitation or crystallization results. Agitators are often required to maintain the crystallizing material in suspension until it is transferred from the unit, for example, to a holding tank. Depending on the degree of crystallization achieved, the solution may have to be recycled through the cooling tank a number of times. Apparatus employed for such purposes is frequently complex, often involving a number of separate tanks and recycling systems, and large, especially in terms of floor space required. In addition, such systems often involve a relatively low rate of circulation of fluids, in order to permit a sufficient residence time in the heat exchange unit for the desired cooling to take place. Low circulation rates of a crystallizing fluid often result in the collection of crystallized particles as a coating on the solid surfaces of the apparatus and a resultant fouling of the apparatus. As a result, not only have the manufacturing costs of such units been high, but installation, operation, and maintenance costs as well.

Accordingly, it is an object of the present invention to provide an improved cooling crystallization apparatus of an integral forced circulation type, which is especially useful for the cooling of caustic catholyte liquor from electrolytic diaphragm cells and the crystallization of dissolved salts therefrom.

It is a further object of the present invention to provide an improved, forced circulation cooling crystallizer having a relatively compact, simple design having improved maintenance characteristics and which will operate efficiently and economically over a wide range of operating conditions.

These and other objects and advantages will become apparent to those skilled in the art from the following detailed description.

STATEMENT OF THE INVENTION

In accordance with the above objects, the present invention provides an integral forced circulation cooling crystallizer for the processing of fluids, which comprises, in vertical disposition: (a) an upper fluid holding chamber having an inlet and outlet for the fluid to be processed and having a partition means vertically disposed therein to provide an inlet section and an outlet section, the partition means being positioned so as to permit fluid flow between the sections at the upper region and prevent fluid flow between the sections at the lower region; (b) a heat exchange chamber comprising a multiplicity of separate vertically disposed tubular elements, a fluid inlet and outlet to permit the flow of a heat exchange fluid through the extra-tubular portion of the heat exchange chamber, and a multiplicity of horizontally disposed baffles adapted to direct the flow of heat exchange fluid through the extra-tubular portion of the heat exchange chamber; and (c) a lower pump chamber, vertically partitioned to provide an intake section and a discharge section and having a pump means disposed therein to provide forced fluid circulation between the intake section and the discharge section. A first portion of the tubular elements provides direct fluid communication between the inlet section of the holding chamber and the intake section of the pump chamber; while second portion of the tubular elements provides direct fluid communication between the discharge section of the pump chamber and the outlet section of the holding chamber. In response to the pump means, the fluid to be processed circulates sequentially from the inlet section of the holding chamber, through the first portion of tubular elements, through the intake and discharge sections of the pump chamber, through the second portion of the tubular elements, to the outlet section of the holding chamber.

For a more complete understanding of the present invention, reference is made to the accompanying drawings, wherein.

The apparatus of the present invention is constructed so that the holding chamber, heat exchange chamber, and pump chamber are formed as an integral vertical unit, providing advantages in economy of construction and ease of installation, while minimizing the amount of floor space required. The holding chamber and pump chamber are vertically partitioned in such a manner that the fluid to be processed may be circulated, by means of an internal circulating pump, in a generally vertical direction, first downward from the holding chamber through the heat exchange chamber to the pump chamber and then upwards through the heat exchange chamber to the holding chamber where it may be withdrawn and/or recirculated within the unit. The simplicity of design and flow pattern permits a relatively high fluid velocity whereby the crystallizing materials are more readily maintained in suspension and the problems of plugging or fouling from deposits of the crystallizing material are minimized.

The cooling crystallizer of the present invention is useful in a variety of applications, especially in the chemical processing industries, wherever heating or cooling of a fluid is required. The apparatus is especially useful in the processing of aqueous sodium hydroxide-sodium chloride solutions, such as the catholyte liquor from electrolytic diaphragm cells, for the cooling and resultant crystallization of sodium chloride.

DESCRIPTION OF PREFERRED EMBODIMENTS

Figure 1:
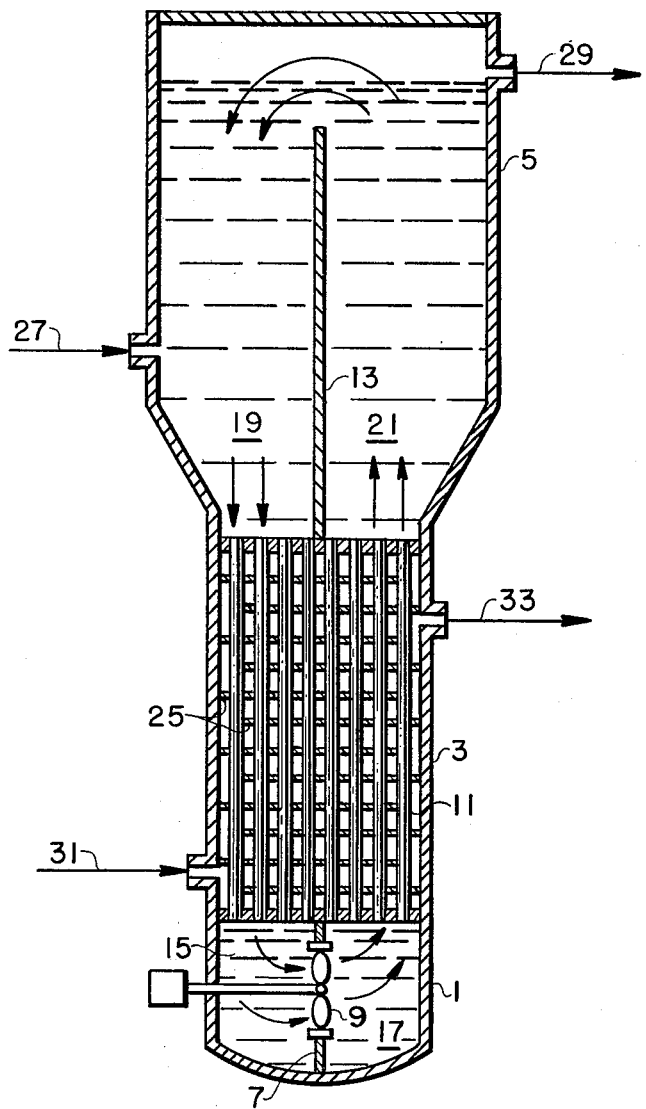
FIG. 1 is a vertical section of a cooling crystallizer of the present invention.

Referring now more specifically to the drawings, in FIG. 1 there is shown a vertical section of a cooling crystallizer of the present invention, having a lower pump chamber 1, surmounted by a heat exchange chamber 3, which heat exchange chamber is surmounted by a holding chamber 5.

Within the pump chamber 1, partition number 7 is disposed so as to separate the pump chamber into two sections, an intake section 15, and a discharge section 17. A pump means 9, is horizontally mounted within the pump chamber to provide forced circulation of the fluid to be processed from its intake side, that is intake section 15, to its discharge side, that is discharge section 17.

The heat exchange chamber 3 is surmounted on the pump chamber 1 and contains a multiplicity of vertically disposed tubular elements 11, the lower ends of which are in direct fluid communication with the pump chamber and the upper ends of which are in direct fluid communication with the holding chamber. The partition 7, of the pump chamber is positioned so that the lower ends of a portion of the tubular elements 11 are in direct fluid communication only with intake section 15, while the remainder of the tubular elements 11, are in direct fluid communication with only discharge section 17. There are also provided a fluid inlet 31 for the introduction of a heat exchange fluid, such as cooling water, or other heat exchange fluid into chamber 3, and a fluid outlet 33 for the removal of the heat exchange fluid. There is further provided a multiplicity of horizontally disposed baffles 25 positioned in an alternating fashion to direct the flow of the heat exchange fluid so as to minimize the possibility of random channeling and increase contact between the heat exchange fluid and the tubular elements.

Surmounted on the heat exchange chamber 3 is fluid holding chamber 5, having a fluid inlet 27, for the introduction of the fluids to be processed and a fluid outlet 29 for the removal of the processed fluid. A partition member 13 is positioned to separate the holding chamber 5 into two sections, an inlet section 19 and an outlet section 21. Partition member 13 further provides that the upper ends of a portion of tubular elements 11 are in direct fluid contact only with inlet section 19, while the upper ends of the remainder of the tubular elements are in direct fluid communication only with outlet section 21. Those tubular elements which are in direct fluid communication with inlet section 19 of the holding chamber 5 are those whose lower ends are in direct fluid communication only with intake section 15 of the pump chamber while those tubes in direct fluid communication with outlet section 21 of the holding chamber are those whose lower ends are in direct fluid communication only with discharge section 17 of the pump chamber. Partition member 13 is positioned below the anticipated liquid level of the holding chamber, that is, below the level of fluid outlet 29, thus allowing a portion of the fluid circulating upward through outlet section 21 to be withdrawn through outlet 29 while a portion of the fluid flows over the top of partition member 13 and is recirculated with the fluid entering at inlet 27. The exact height of the partition member 13 will be close to, but below the liquid level and will depend in part on the proportion of fluid desired to be recirculated in a given process. Partition member 13 may be conveniently constructed in such a manner that is adjustable in height, thus providing an even greater degree of adaptability to various cooling and crystallization processes.

Figure 2:
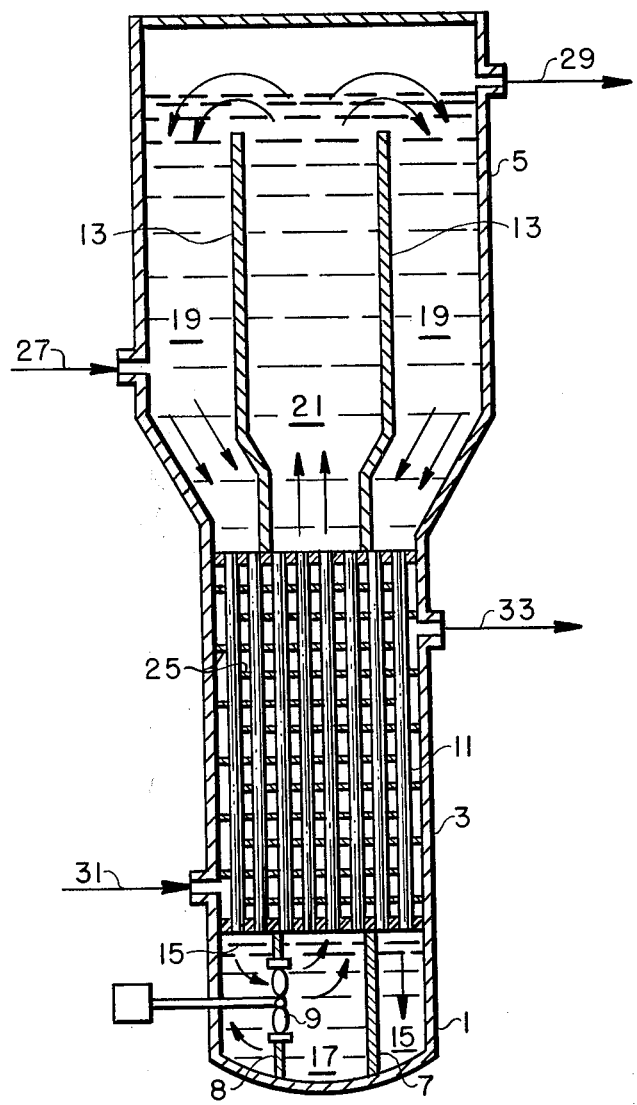
FIG. 2 is a vertical section of an alternative embodiment of the cooling crystallizer of the present invention.

Referring now to FIG. 2, there is illustrated another embodiment of the present invention wherein a modified form of the partition members in both the holding chamber and pump chamber is employed. In this embodiment, as in the embodiment of FIG. 1, the pump chamber 1, is surmounted by the heat exchange chamber 3, which in turn is surmounted by the holding chamber 5, the three chambers being formed as an integral unit. Within the pump chamber 1, cylindrical partition member 7 is positioned so as to define a centrally disposed inner pump discharge section 17, and an intake section 15, concentrically disposed around the discharge section. In one portion 8, of the partition member 7, a pump means is horizontally mounted to provide forced fluid circulation from intake section 15 to discharge section 17. The partition member 7 is further positioned so that the lower ends of a central portion of the tubular elements 11, of the heat exchange chamber 3, are in direct fluid communication with only the discharge section 17 while the lower ends of the peripheral or outer portion of tubular elements 11 are in direct fluid communication with only the intake section 15 of the pump chamber.

In the holding chamber 5, a substantially cylindrical partition member 13 is positioned so as to form a centrally disposed outlet section 21 and a peripherally disposed inlet section 19. Inlet section 19 is in direct fluid communication with the upper end of those tubular elements 11 whose lower ends are in direct fluid communication with intake section 15 of the pump chamber. Outlet section 21 of the holding chamber is in direct fluid communication with the upper ends of those tubular elements whose lower ends are in direct fluid communication with discharge section 17 of the pump chamber.

Figure 3:
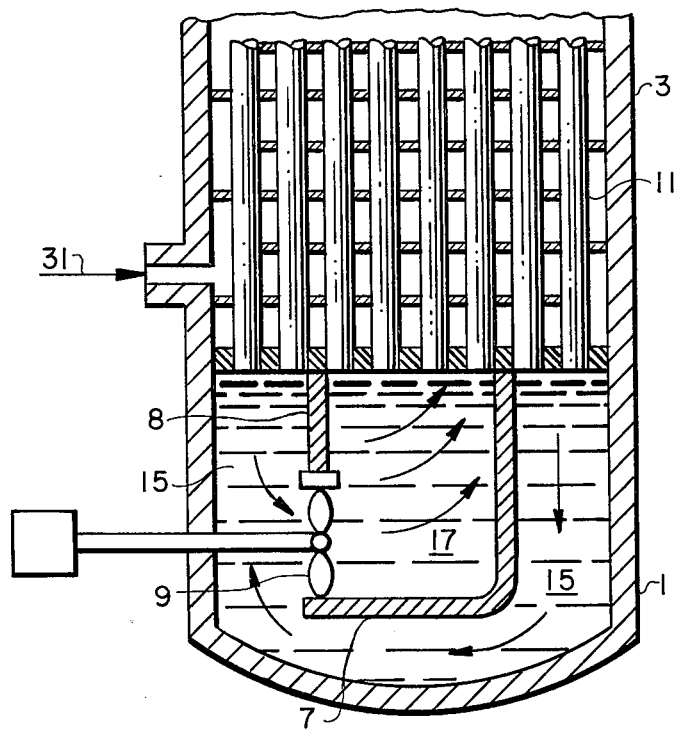
FIG. 3 is an enlarged vertical section of a portion of the heat exchange chamber and an alternative embodiment of the pump chamber of the cooling crystallizer of the present invention.

In FIG. 3, there is shown an enlarged view of a further modification of the pump chamber of the cooling crystallizer apparatus of this invention. This modification may be employed, for example, in place of the pump chamber 1 in an embodiment of the invention as shown in FIG. 2. In the embodiment of FIG. 3, the cylindrically shaped partition member 7 is formed with a bottom portion which is spaced apart from the bottom of the pump chamber, thus permitting intake section 15, to extend along the bottom of the pump chamber as well as around the side.

It will be apparent that by forming the present cooling crystallizer as an integral, vertical unit, simplification and economy in construction, installation and operation are realized. Furthermore, by mounting the pump means horizontally within the pump chamber, it is found that not only are efficiencies in construction and operation obtained, but additionally, a versatility in operation is further realized in that the pump may be run efficiently in either direction, thus making it possible to backwash the tubular elements to remove lumps or other obstructions, should this be necessary or desirable.

It will be appreciated that although various specific embodiments of the cooling crystallizer apparatus of the present invention have been described hereinabove, various modifications and combinations of these specific features may be utilized without departing from the spirit of the present invention. Thus, for example, although the heat exchange chamber has been shown as being formed of a multiplicity of tubular elements divided by flow into two portions, either portion of the tubular elements may vary in the number thereof or in the diameter of the individual tubular elements. Either portion may be formed, for example, as a single, large diameter pipe or conduit. In the most preferred embodiment, however, a plurality of tubular elements will be employed as has been illustrated in order to obtain the maximum heat transfer efficiency, both during the transfer of solutions from the holding chamber to the pump chamber, and in the return of the solutions to the holding chamber. It has been found that as a result of the advantageous fluid flow pattern of the apparatus of the present invention, relatively large diameter tubular elements may be employed, thus minimizing problems of plugging and the like. The exact number and diameter of the tubular elements may be varied, depending on the anticipated flow-rate and the proportion of material to be recirculated.

The cooling crystallizer of the present invention may be employed as a single unit or in series with one or more similar units and in combination with various other apparatus, such as settling tanks, filters, and the like, for removal of the crystallized materials.

The apparatus of the present invention may be formed of any suitable materials which will withstand the temperature, pressure and corrosive conditions, to which it will be subjected during use. Materials heretofore used in the construction of apparatus for the processing of caustic liquors have included, for example, nickel and the various stainless steels. Where the cooling crystallizer of the present invention is to be used in the crystallization of sodium chloride from caustic solutions, a preferred material of construction is a ferritic stainless steel, substantially free of nickel, identified as "E-Brite", and sold by the Airco Co. The use of this material to form an evaporation apparatus is described more fully in a copending application, Ser. No. 420,357, filed Nov. 29, 1973.

While there have been described various embodiments of the present invention, it is to be understood that the specific materials, methods and configurations referred to, are merely exemplary of the present invention and the manner in which it may be practiced, and that the details disclosed herein can be modified without departing from the spirit and scope of the invention.

What is claimed is:

1. An integral forced circulation cooling crystallizer apparatus consisting of, in vertical disposition:
   a. an upper liquid holding chamber having liquid inlet and liquid outlet and having a partition means vertically disposed therein providing an inlet section and an outlet section, said partition means being positioned so as to permit liquid flow over the top of said partition means between said sections at the upper region and prevent liquid flow between said sections at the lower region;
   b. a heat exchange chamber comprising a multiplicity of separate vertically disposed tubular elements, a liquid inlet and outlet to permit the flow of a heat exchange liquid only through the extra-tubular portion of said heat exchange chamber, and a multiplicity of horizontally disposed baffles adapted to direct the flow of said heat exchange liquid upward in a horizontally alternating path through the extratubular portion of said heat exchange chamber;
   c. a lower pump chamber, having partition means vertically disposed to provide an intake section and a discharge section and having a pump means disposed therein to provide forced circulation of the liquid to be processed between said intake section and said discharge section;
   the tubular elements of said heat exchange chamber being disposed such that a first portion of said tubular elements provide direct liquid communication between said inlet section of the holding chamber and said intake section of the pump chamber; and a second portion of said tubular elements provide direct liquid communication between said discharge section of the pump chamber and said outlet section of the holding chamber;
   whereby in response to said pump means, the liquid to be processed circulates, in sequence, from the inlet section of the holding chamber, downwardly through the first portion of said tubular elements, through the intake and discharge sections of the pump chamber, upwardly through the second portion of the tubular elements, to the outlet section of the holding chamber.

2. A cooling crystallizer apparatus as claimed in claim 1 wherein the partition means in said holding chamber is in the form of a substantially vertically disposed plate which divides at least the lower portion of said holding chamber into two side by side sections, and the partition means in said pump chamber is in the form of a substantially vertically disposed plate which divides said pump chamber into two side by side sections and in which said pump means is horizontally mounted with its discharge side in one of said sections and its intake side in the other of said sections.

3. A cooling crystallizer apparatus as claimed in claim 1 wherein the partition means in said holding chamber is in the form of a substantially vertically disposed cylinder which divides at least the lower portion of said holding chamber into two substantially concentric cylindrical sections and the partition means in said pump chamber is in the form of a substantially vertically disposed cylinder which divides said pump chamber into two substantially concentric cylindrical sections and in which said pump means is horizontally mounted with its discharge side in one of said sections and its intake side in the other of said sections.

4. A cooling crystallizer apparatus as claimed in claim 3 wherein the partition means in said pump chamber includes a bottom portion substantially parallel to, but spaced apart from, the bottom portion of said pump chamber.

* * * * *

UNITED STATES PATENT OFFICE
CERTIFICATE OF CORRECTION

PATENT NO. : 3,976,430

DATED : August 24, 1976

INVENTOR(S) : James E. Houston et al

It is certified that error appears in the above-identified patent and that said Letters Patent are hereby corrected as shown below:

Abstract, line 9, "between the sections at the lower region;" should read -- between the sections at the upper region and prevent fluid flow between the sections at the lower region; --; line 17, "and flow of" should read -- and --; line 21, "forced circulation 36 section of the fluid" should read -- forced circulation of the fluid --.

Signed and Sealed this

Eleventh Day of January 1977

[SEAL]

Attest:

RUTH C. MASON
*Attesting Officer*

C. MARSHALL DANN
*Commissioner of Patents and Trademarks*